(12) United States Patent
Richardson

(10) Patent No.: US 7,512,650 B2
(45) Date of Patent: Mar. 31, 2009

(54) PHYSICAL LAYER RECOVERY IN A STREAMING DATA DELIVERY SYSTEM

(75) Inventor: John William Richardson, Hamilton, NJ (US)

(73) Assignee: Thomson Licensing, Boulogne Billancourt (FR)

(*) Notice: Subject to any disclaimer, the term of this patent is extended or adjusted under 35 U.S.C. 154(b) by 1024 days.

(21) Appl. No.: 10/043,540

(22) Filed: Jan. 11, 2002

(65) Prior Publication Data
US 2003/0135544 A1 Jul. 17, 2003

(51) Int. Cl.
*G06F 15/16* (2006.01)

(52) U.S. Cl. ............ 709/203; 709/230; 709/233; 709/217; 370/282; 370/466; 370/216

(58) Field of Classification Search ........... 709/203, 709/229–233, 238, 249, 235, 234, 217–219; 710/52; 370/217, 230, 235, 352, 228, 468, 370/252, 394, 328, 282; 713/151; 714/748, 714/4, 749; 348/419, 500, 413
See application file for complete search history.

(56) References Cited

U.S. PATENT DOCUMENTS

| | | | | |
|---|---|---|---|---|
| 5,745,696 A * | 4/1998 | Mendelson et al. | ......... | 709/233 |
| 5,881,245 A * | 3/1999 | Thompson | ......... | 709/219 |
| 5,898,670 A * | 4/1999 | Hoebeke et al. | ......... | 370/468 |
| 5,913,041 A * | 6/1999 | Ramanathan et al. | ......... | 709/233 |
| 6,032,194 A * | 2/2000 | Gai et al. | ......... | 709/239 |
| 6,172,990 B1 * | 1/2001 | Deb et al. | ......... | 370/474 |
| 6,324,582 B1 * | 11/2001 | Sridhar et al. | ......... | 709/230 |
| 6,377,972 B1 | 4/2002 | Guo et al. | | |
| 6,519,636 B2 | 2/2003 | Engel et al. | | |
| 6,563,816 B1 * | 5/2003 | Nodoushani et al. | ......... | 370/352 |
| 6,757,248 B1 * | 6/2004 | Li et al. | ......... | 370/235 |
| 6,757,367 B1 * | 6/2004 | Nicol | ......... | 379/90.01 |
| 6,760,860 B1 * | 7/2004 | Fong et al. | ......... | 714/4 |
| 6,901,048 B1 * | 5/2005 | Wang et al. | ......... | 370/228 |
| 7,106,760 B1 * | 9/2006 | Perumal et al. | ......... | 370/535 |
| 7,151,754 B1 * | 12/2006 | Boyce et al. | ......... | 370/328 |
| 2002/0122395 A1 * | 9/2002 | Bourlas et al. | ......... | 370/329 |
| 2004/0071101 A1 * | 4/2004 | Lu et al. | ......... | 370/282 |

FOREIGN PATENT DOCUMENTS

JP 08-298650 12/1996

* cited by examiner

*Primary Examiner*—Jude Jean-Gilles
(74) *Attorney, Agent, or Firm*—Joseph J. Laks; Robert B. Levy; Jeffrey D. Hale

(57) ABSTRACT

An asynchronous transfer mode (ATM) digital document delivery system is provided. A customer premise unit is configured to permit a customer to order and receive a data stream. A buffer is coupled to the customer premise unit to store the data stream before transmitting the data stream to a customer. A server includes digital documents stored thereon for delivery to customers through a switched ATM network. A control mechanism is employed to control a data rate of the data stream between the server and the buffer to ensure maintenance of a steady data stream from the customer premise unit to a customer during a loss of a physical layer between the server and the customer premise unit.

13 Claims, 2 Drawing Sheets

PHYSICAL LAYER RECOVERY IN A STREAMING DATA DELIVERY SYSTEM

FIELD OF THE INVENTION

The present invention generally relates to network communications and, more particularly, to an asynchronous transfer mode (ATM) streaming data delivery system and method for recovering streaming data after a physical layer protocol is lost.

BACKGROUND OF THE INVENTION

Video on demand (VoD), audio on demand and other streaming data transfer applications are emerging technologies for home entertainment service businesses. For example, a VoD service permits a customer to request a video in real-time from a large collection of videos stored on a server located in a remote facility. Video transfer can be provided over a network system, such as a telephone system or a cable network, for example. A sufficient amount of bandwidth must be available however to continuously transfer the data from the storage system to the customer's equipment. The amount of bandwidth between a video server and the customer's equipment ultimately determines the maximum number of simultaneous video streams the server can support at any given time.

One key communication transmission technology that is enabling transformation of existing public information networks to accommodate higher bandwidth needs is Asymmetric Digital Subscriber Line (ADSL), a modem technology. ADSL converts existing twisted-pair telephone lines into access paths for multimedia and high-speed data communications. ADSL rates expand existing access capacity by a factor of, say, 50 or more without new cable installations.

Asymmetric Digital Subscriber Line ADSL technology involves modems attached across twisted pair copper wiring in which higher transmission rates can be achieved. When transferring data over these twisted pairs, it is possible that the DSL modem physical layer will lose synchronization due to changing line conditions. These line conditions can be dependent upon impulse noises, and other nearby sources of interference. It is also possible that this loss of synchronization can occur during a period of time when a customer is watching a program (e.g., a pay-per-view service such as Video on Demand (VoD)). If the modem were to lose synchronization and a re-synchronization is attempted, the customer loses a portion of the streaming data and the video, audio, etc. is interrupted or even terminated. If the DSL modem loses physical layer synchronization, the video or data stream can no longer be sent across the network from a video server to a customer and an interruption of service results.

Therefore, a need exists for a system and a method that prevents interruption of a data stream when a DSL modem loses physical layer synchronization.

SUMMARY OF THE INVENTION

In accordance with the present invention, an asynchronous transfer mode (ATM) digital document delivery system is provided. A customer premise unit is configured to permit a customer to order and receive a data stream. A buffer is coupled to the customer premise unit to store the data stream before transmitting the data stream to a customer. A server includes digital documents stored thereon for delivery to customers through a switched ATM network. A control mechanism is employed to control a data rate of the data stream between the server and the buffer to ensure maintenance of a steady data stream from the customer premise unit to a customer during a loss of a physical layer between the server and the customer premise unit.

A method for maintaining a data stream over an asynchronous transfer mode (ATM) network includes providing a customer premise unit configured to permit a customer to receive a data stream and storing a portion of the data stream in a buffer before transmitting the data stream to a customer. The data stream is transmitted from a server through a switched ATM network, and a data rate of the data stream is controlled between the server and the buffer to ensure maintenance of a steady data stream from the customer premise unit to a customer during a loss of a physical layer between the server and the customer premise unit.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a recovery mechanism to maintain a data stream over a digital subscriber network in the event of a physical layer loss. The recovery mechanism ensures an adequate amount of data is buffered at a customer's location to provide sufficient delay in the system to account for down time to restore the physical layer. In a modem technology, such as, digital subscriber line (DSL), resynchronizations of the DSL modems are often needed. During the resynchronization process, the transferred data stream is broken resulting in a pause or other interruption at the customer's location. Advantageously, the recovery mechanism is transparent to the customers for the application of streaming services (e.g., audio and video when a loss of the DSL modem physical layer synchronization occurs, for example, the interruption is transparent to the customer while the DSL modem is in the process of re-synchronizing. In accordance with the present invention, if a modem were to lose synchronization and a re-synchronization is attempted and successfully completed immediately afterwards, the customer can experience service interruption. The customer will not notice any degradation of service during their viewing or listening.

It is to be understood that the present invention is described in terms of a video-on-demand (VoD) system; however, the present invention is much broader and may include any digital multimedia documents, for example, audio documents, which are capable of delivery over a switched network. In addition, the present invention is applicable to any system ordering method including orders taken by telephone, set top boxes, computer, satellite links, etc. The present invention is described in terms of a DSL network; however, the concepts of the present invention may be extended to cable, wireless or other network types using ATM technology.

It should also be understood that the elements shown in the FIGS. may be implemented in various forms of hardware, software or combinations thereof. Preferably, these elements are implemented in hardware on one or more appropriately programmed general-purpose devices, which may include a processor, memory and input/output interfaces.

Figure 1:
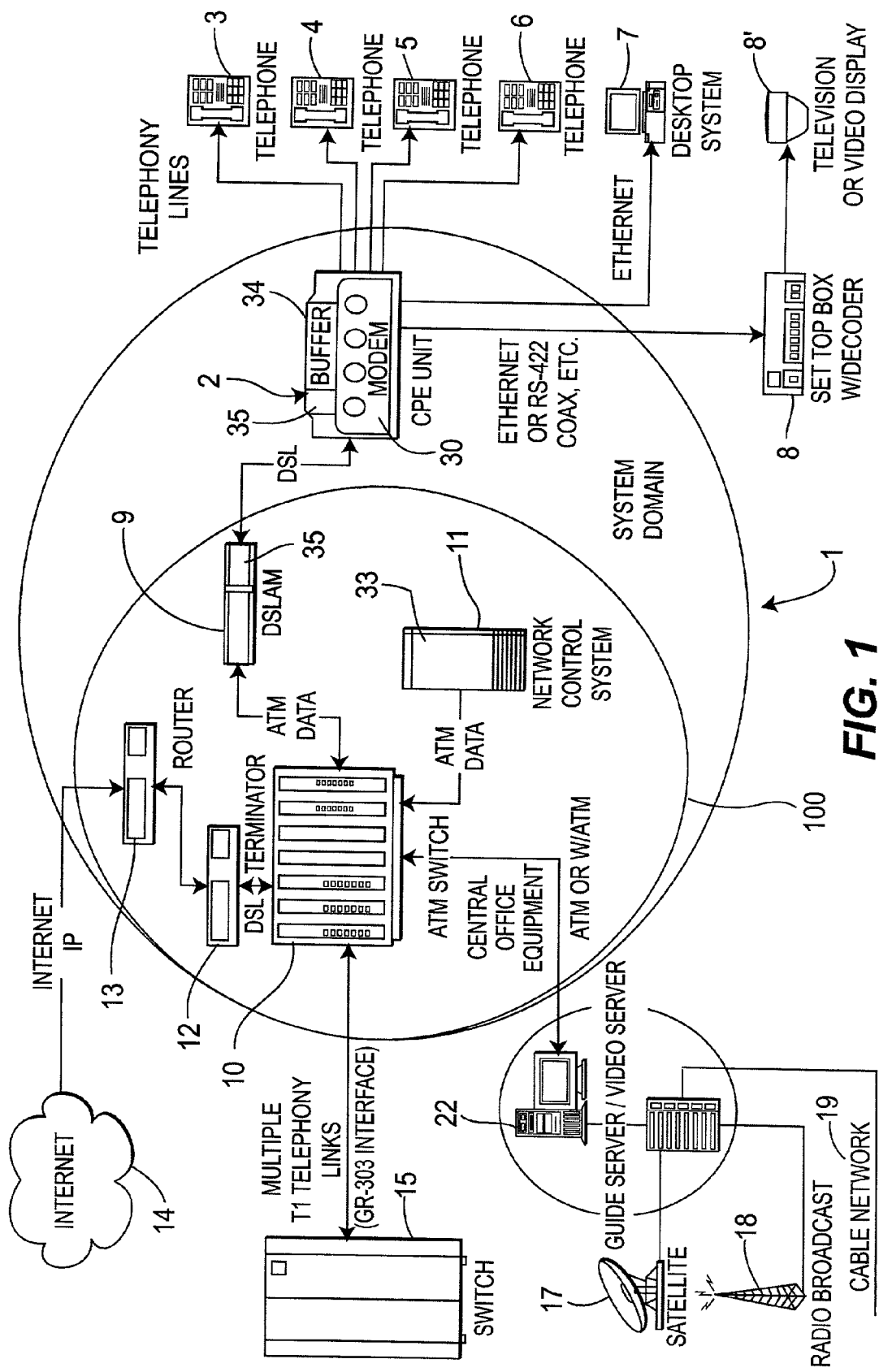
FIG. 1 is an exemplary digital subscriber line (DSL) system architecture showing a server system for providing streaming data to customers in the event of a loss of a physical layer in accordance with the present invention.

Referring now in specific detail to the drawings in which like reference numerals identify similar or identical elements throughout the several views, and initially to FIG. 1, a DSL system architecture 1 for integrating voice, data and video services is shown in an exemplary DSL environment for employing the present invention. The system block diagram 1 is composed of several functional blocks. The system domain is composed of Central Office (CO) Equipment 100 and Customer Premise Equipment (CPE) 2. The component blocks within the system domain and their respective interfaces are: customer premise equipment (CPE) 2, Digital Subscriber Line Access Multiplexer (DSLAM) 9, an ATM switch 10 and an internet protocol (IP) router 13 and ATM terminator 12. The ATM switch 10 is shown coupled to a program guide server/video server 22 to satellite 17, radio broadcast 18 or cable 19 networks. The ATM switch 10 is also coupled over the DSL terminator 12 and IP router 13 pair to receive Internet Protocol IP packet data from the Internet 14.

The current customer premise equipment (CPE) 2 includes a DSL modem unit 30 that interfaces with separate analog telephones 3-5 over a plain old telephone service (POTS), a 10 Base-T Ethernet connection to a PC desktop system 7, and an Ethernet or RS-422 connection to a set-top box with a decoder 8 for connection to a television or video display 8'. From the customer's analog end, the CPE device 2 accepts the analog input from each of the telephones 3-5, converts the analog input to digital data, and packages the data into ATM packets (POTS over ATM), with each connection having a unique virtual channel identifier/virtual path identifier (VPI/VCI). Known to skilled artisans, ATM is a connection-oriented protocol, and, as such, there is a connection identifier in every cell header, which explicitly associates a cell with a given virtual channel on a physical link. The connection identifier includes two sub-fields, the virtual channel identifier (VCI) and the virtual path identifier (VPI). Together these identifiers are used at multiplexing, demultiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

The Ethernet data is also encapsulated into ATM cells with a unique VPI/VCI. The ATM cell stream is sent to the DSL modem of the CPE unit 2 to be modulated and delivered to the DSLAM unit 9. Going in the other direction, the DSL signal is received and demodulated by the DSL modem 30 in the customer premise equipment 2 and delivered to VPI/VCI detection processing. The ATM cell data with VPI/VCI matching that of the end user's telephone is then extracted and converted to analog POTS to be delivered to the telephone. The ATM cell data with VPI/VCI matching that of the end user's Ethernet is extracted and delivered to an Ethernet transceiver for delivery to the port.

The Digital Subscriber Line Access Multiplexer (DSLAM) 9 demodulates data from multiple DSL modems and concentrates the data onto the ATM backbone network for connection to the rest of the network. DSLAM 9 provides back-haul services for package, cell, and/or circuit based applications through concentration of the DSL lines onto ATM outputs to the ATM switch 10.

The ATM switch 10 is the backbone of the ATM network. The ATM switch 10 performs various functions in the network, including cell transport, multiplexing and concentration, traffic control and ATM-layer management. Of particular interest in the system domain 1, the ATM switch provides for the cell routing and buffering in connection to the DSLAM 9 and the Internet gateway (Internet Protocol IP router 13 and DSL or ATM terminator 12), and T1 circuit emulation support in connection with the multiple telephony links switch 15. The ATM switch 10 may be coupled to a program guide server/video server 22 to connect and interface with satellite, radio broadcast or cable networks. The ATM switch 10 is also coupled over the ATM terminator 12 and IP router 13 pair to receive Internet Protocol IP packet data from the Internet 14.

NCS 11 provides for the termination point for the signaling that controls the setting up and tearing down of virtual circuits based on users access rights and requests. In addition, NCS 11 also provides functions for permitting a customer to control the content flow, e.g., functions such as pause, stop, play, advance, reverse, etc. of the content may be controlled by a user in much the same way as traditional VCR functionalities. NCS 11 also provides information on customer activity for billing purposes.

NCS 11 provides for address translation, demand assignment and call management functions and manages the DSL/ATM network including the origination and termination of phone calls and service requests and orders. NCS 11 is essentially the control entity communicating and translating control information between the class 5 PSTN switch 15 (using e.g., the GR-303 protocol) and the CPE 2. The network control system 11 is available for other functions such as downloading code to the CPE, and bandwidth and call management functions, as well as other service provisioning and setting up tasks.

NCS 11 may be setup to send, for example, videos from video server 22 to customers. The video data stream is sent from video server 22, located in the service provider's network, to CPE 2 on an ATM virtual circuit set up by NCS 11. The video leaves video server 22 and enters an ATM head-end network 1, enters DSLAM 9, and then is received at CPE 2. CPE 2 can send the video to the set top box 8, which includes a video decoder. The interface between CPE 2 and set top box 8 may include, e.g., 1394 cable, Ethernet link, coax cable, etc. This is the steady state condition of the system when a customer is viewing streaming content.

CPE 2 includes a DSL modem 30. If DSL modem 30 loses physical layer synchronization, the video stream can no longer be sent across the network from video server 22 to customer premise equipment 2 and an interruption of service results. The present invention includes a system and method that provides continuous service when a DSL modem loses physical layer synchronization, and an interruption of the content viewing will not result.

NCS 11 includes a management program 33, which is employed in conjunction with signaling mechanisms 35 included in CPE 2 and DSLAM 9. Additional hardware components on the customer side include a buffer 34 in the CPE 2 that can buffer the data stream to provide time to resynchronize a modem or bring the physical layer of the protocol back on-line. In one embodiment, buffer 34 includes a volatile memory, which is sized to permit about 20 to about 30 seconds worth of streaming content. This is based on the data transfer rate. Initially when on-demand streaming content is requested, buffer 34 is preferably filled before the video is sent to set top box decoder 8 for decoding and display.

Signaling mechanisms 35 may be implemented as virtual circuits or hardwired circuits between NCS 11 and DSLAM 9 or CPE 2. Once the loss of physical layer signal is detected at DSLAM 9, DSLAM 9 will immediately forward a message to the NCS 11. NCS 11 checks to see if the customer is currently receiving on-demand streaming content. While this is happening, DSLAM 9 is attempting to resynchronize the DSL modem physical layer. If the customer is receiving on-demand streaming content, NCS 11 is ready to notify the video server when resynchronization has occurred.

Once the loss of physical layer signal is detected at CPE 2, CPE 2 may notify set top box 8 to slow down the decoder and decode the video at a slower rate (to permit the needed delay, e.g., to permit buffer 34 to empty at a slower rate), or CPE 2 will continue to empty buffer 34 to set top box 8 at the normal rate or at a slower rate if needed.

Once resynchronization has occurred at DSLAM 9 and CPE 2, CPE 2 sends a message to NCS 11 indicating a last element stored in buffer 34. NCS 11 notifies video server 22 of the last element information, and then video server 22 increases the rate at which the streaming content is sent to buffer 34 on the CPE 2. The streaming content will be sent from video server 22 to buffer 34 on CPE 2 at a higher rate for a period of time. The period of time for the higher rate is mainly dependent upon the bandwidth available between video server 22 and CPE 2. Even though CPE 2 is receiving the streaming content at a higher rate, CPE 2 is not sending the streaming content to set top box decoder 8 at this higher rate. CPE 2 is still sending the content to set top box 8 at the normal specified rate. Once buffer 34 has been accordingly filled at CPE 2, CPE 2 sends a message to the NCS 11 indicating that buffer 34 is full and video server 22 needs to go back to sending streaming content at the normal rate. NCS 11 notifies video server 22 of this, and video server 22 will then resume sending the streaming content at the appropriate rate.

The signaling between CPE 2 and NCS 11 is preferably carried on a common or a unique ATM virtual circuit. In one embodiment, it is carried on a unique virtual circuit. Each customer CPE 2 has a unique virtual circuit between NCS 11 and CPE 2. The signaling between NCS 11 and video server 22 is preferably carried on a common or unique virtual circuit.

Figure 2:
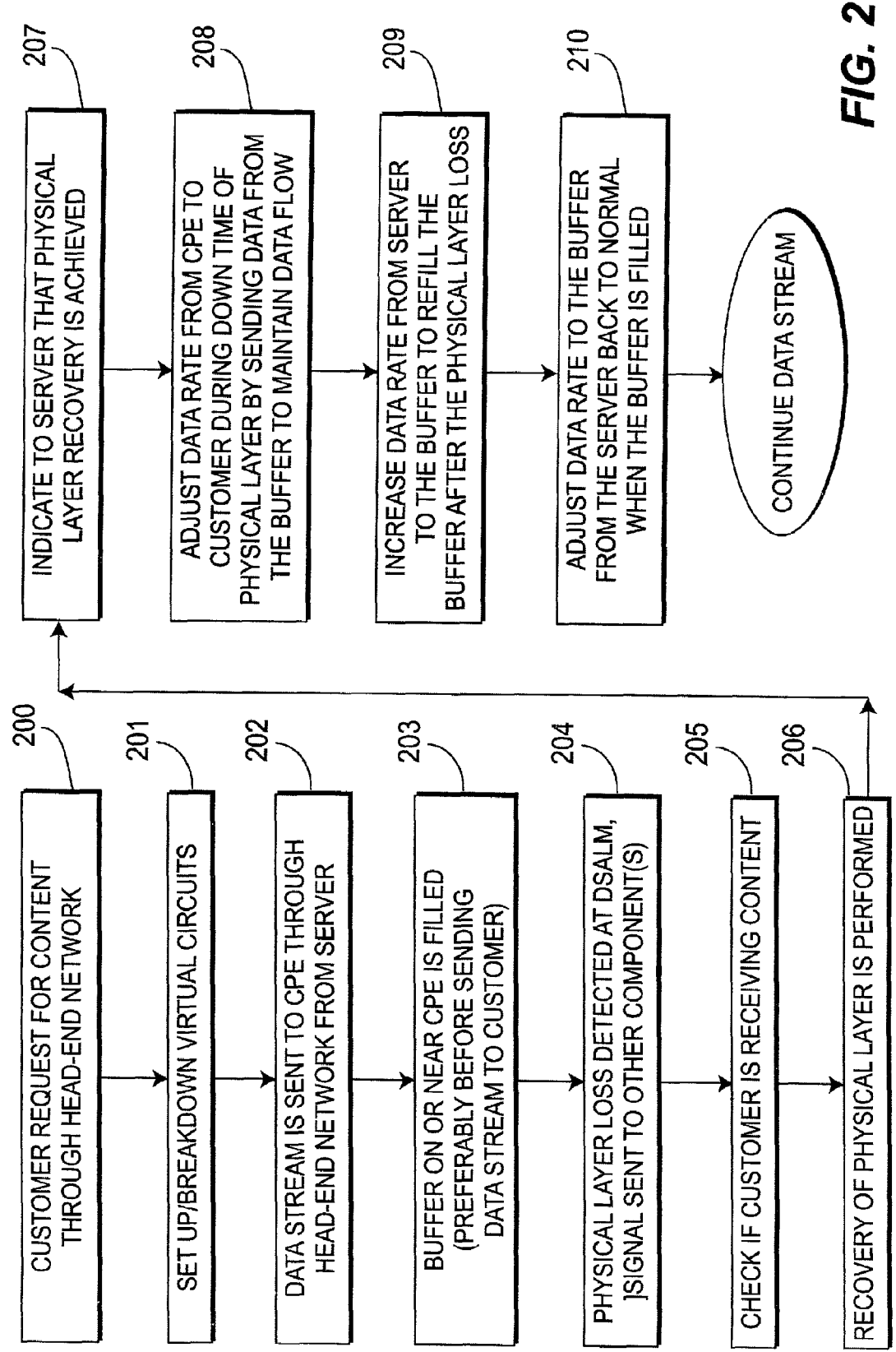
FIG. 2 is a block diagram of an illustrative process flow for providing streaming data to customers in the event of a loss of a physical layer in accordance with the present invention.

Referring to FIG. 2 with continued reference to FIG. 1, a flow diagram is shown for maintaining a data stream in case of the loss of a physical layer in accordance with the present invention. FIG. 2 will be illustratively described in terms of an on-demand document request system, such as, a video-on-demand (VoD) system. However, other data streaming systems may also be employed in accordance with the present invention. In block 200, a request by a customer is made for a digital document, such as a video file. Video requests are preferably generated by customers using set top box 8, although other devices may be employed (e.g., a telephone). The video request is sent from CPE unit 2, routed by DSLAM 9 through ATM switch (or network) 10 and received by video server 22. In block 201, NCS 11 performs network management functions to (e.g., setting up and tearing down the virtual circuits based on the users access rights and requests) regulate access to the content.

In block 202, the video is sent to CPE 2. The video data stream is sent from video server 22, located in the service provider's network, to CPE 2 on an ATM virtual circuit set up by NCS 11. The video leaves video server 22 and enters an ATM head-end network 1, enters DSLAM 9, and then is received at CPE 2. CPE 2 can send the video to the set top box 8, which includes a video decoder. In block 203, buffer 34 is filled to provide a delay for resynchronization or to fix other problems in the physical link in network 1. Buffer 34 is preferably filled before the video is sent to set top box decoder 8 for decoding and display.

If DSL modem 30 loses physical layer synchronization, the video stream can no longer be sent across the network from video server 22 to customer premise equipment 2 and an interruption of service results. If the physical layer is lost, signaling mechanisms are employed to alert NCS 11, DSLAM 9 and CPE 2. In block 204, loss of the physical layer signal is detected at DSLAM 9 and DSLAM 9 forwards a message or signal to NCS 11. In block 205, NCS 11 checks to see if the customer is currently receiving on-demand streaming content. While this is happening, in block 206, DSLAM 9 is attempting to resynchronize the DSL modem physical layer. If the customer is receiving on-demand streaming content, NCS 11 is ready to notify video server 22 when resynchronization has occurred, in block 207.

Once the loss of physical layer signal is detected at CPE 2, CPE 2 may notify set top box 8 to slow down the decoder and decode the video at a slower rate (to permit the needed delay, e.g., to permit buffer 34 to empty at a slower rate), or CPE 2 will continue to empty buffer 34 to set top box 8 at the normal rate or at a slower rate if needed in block 208.

Once resynchronization has occurred at DSLAM 9 and CPE 2, an increased data rate from video server 22 is initiated in block 209. CPE 2 sends a message to NCS 11 indicating a last element stored in buffer 34. NCS 11 notifies video server 22 of the last element information, and then video server 22 increases the rate at which the streaming content is sent to buffer 34 on the CPE 2. The streaming content will be sent from video server 22 to buffer 34 on CPE 2 at a higher rate for a period of time. The period of time for the higher rate is mainly dependent upon the bandwidth available between video server 22 and CPE 2. In block 210, once buffer 34 has been accordingly filled at CPE 2, CPE 2 sends a message to the NCS 11 indicating that buffer 34 is full and video server 22 needs to go back to sending streaming content at the normal rate. NCS 11 notifies video server 22 of this, and video server 22 will then resume sending the streaming content at the appropriate rate. The data stream continues until the service request is satisfied.

Having described preferred embodiments for physical layer recovery in a streaming data delivery system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An asynchronous transfer mode (ATM) digital document delivery system, comprising:
   a customer premise equipment (CPE) unit configured to permit a customer to order and receive a content data stream;
   a buffer coupled to the customer premise equipment unit to store the content data stream before transmitting the content data stream to a customer;
   a server having digital documents stored thereon for delivery to the customer through a switched ATM network;
   means for controlling a data rate of the content data stream between the server and the buffer to ensure maintenance of a steady content data stream from the customer premise equipment unit to the customer during a loss of a physical layer between the server and the customer premise equipment unit, the means for controlling including a network control system coupled to the server and the customer premise equipment unit, wherein the customer premise equipment unit is configured to deliver the content data stream at a rate less than a normal rate when the physical layer is lost, and the network control system is configured for increasing the data rate of the content data stream to the customer premise equipment unit from the server for a period of time when the physical layer is restored, and a multiplexer coupled between the customer premise equipment unit and the network control system, the multiplexer including a signaling mechanism to alert at least one component that the physical layer is lost.

2. The document delivery system, as recited in claim 1, wherein the customer premise equipment unit includes the buffer therein, the buffer including a memory storage capacity sufficient to maintain the content data stream to a customer for an amount of time.

3. The document delivery system, as recited in claim 2, wherein the amount of time includes time needed to restore the physical layer.

4. The document delivery system, as recited in claim 2, wherein the amount of time includes up to 30 seconds.

5. The document delivery system, as recited in claim 1, further comprising virtual circuits set up between the network control system, the customer premise unit and the multiplexer to enable communication therebetween.

6. The document delivery system, as recited in claim 1, wherein the server is configured to deliver the content data stream at a rate greater than a normal rate after the physical layer has been restored.

7. The document delivery system, as recited in claim 6, wherein the server is configured to deliver the content data stream at the normal rate after the buffer has been filled.

8. A method for maintaining a content data stream over an asynchronous transfer mode (ATM) network, comprising the steps of:

providing a customer premise equipment unit configured to permit a customer to receive a content data stream;

storing a portion of the data stream in a buffer before transmitting the content data stream to a customer;

transmitting the content data stream from a server through a switched ATM network;

controlling a data rate of the content data stream between the server and the buffer to ensure maintenance of a steady content data stream from the customer premise equipment unit to a customer during a loss of a physical layer between the server and the customer premise equipment unit, the controlling includes employing a network control system coupled to the server and the customer premise equipment unit wherein the customer premise equipment unit is configured for delivering the content data stream at a rate less than a normal rate when the physical layer is lost, and further comprising the step of the network control system increasing the data rate of the content data stream to the customer premise equipment unit from the server for a period of time when the physical layer is restored, a multiplexer coupled between the customer premise equipment unit and the network control system, and further comprising the step of: when the physical layer is lost, signaling from tile multiplexer to alert at least one component that the physical layer is lost.

9. The method as recited in claim 8, wherein the step of controlling a data rate of the content data stream includes maintaining an amount of data from the data stream in the buffer to continue data flow to a customer for an amount of time after the loss of the physical layer.

10. The method as recited in claim 9, wherein the amount of time includes time needed to restore the physical layer.

11. The method as recited in claim 8, further comprising the step of setting up virtual circuits between the network control system, the customer premise equipment unit and the multiplexer to enable conununication therebetween.

12. The method as recited in claim 8, further comprising the step of delivering the content data stream from the server at a rate greater than a normal rate after the physical layer has been restored.

13. The method as recited in claim 12, further comprising the step of delivering the content data stream at the normal rate after the buffer has been filled.

* * * * *